United States Patent
Condon (10) Patent No.: US 7,588,358 B1
(45) Date of Patent: Sep. 15, 2009

(54) SINGLE LED AND LENS ASSEMBLY

(75) Inventor: Patrick J. Condon, Morris, IL (US)

(73) Assignee: Innovative Lighting, Inc, Roland, IA (US)

( * ) Notice: Subject to any disclaimer, the term of this patent is extended or adjusted under 35 U.S.C. 154(b) by 174 days.

(21) Appl. No.: 11/443,581

(22) Filed: May 31, 2006
(Under 37 CFR 1.47)

Related U.S. Application Data (60) Provisional application No. 60/685,818, filed on May 31, 2005.

(51) Int. Cl.
*F21V 5/00* (2006.01)
(52) U.S. Cl. .................. 362/522; 362/520; 362/485
(58) Field of Classification Search .................. 362/485, 362/540, 520, 522, 541, 542, 332, 337, 338, 362/339, 521, 326, 335, 336, 311.02
See application file for complete search history.

(56) References Cited

U.S. PATENT DOCUMENTS

| | | | | |
|---|---|---|---|---|
| 2,853,595 A | * | 9/1958 | Baldwin | 362/485 |
| 6,070,994 A | * | 6/2000 | Sebek et al. | 362/332 |
| 6,755,556 B2 | * | 6/2004 | Gasquet et al. | 362/329 |
| 6,811,287 B2 | * | 11/2004 | Roller et al. | 362/336 |

OTHER PUBLICATIONS

SAE Surface Vehicle Standard, "Tail Lamps (Rear Position Lamps) for Use on Vehicles 2032 mm or More in Overall Width", Revised Mar. 2000 (8 pages).
Lumileds, Application Brief AB21, "Luxeon Product—Binning and Labeling" Feb. 2005 (7 pages).
Lumileds, Technical Datasheet DS23, "power light source, Luxeon Star", Apr. 2005) (19 pages).

* cited by examiner

*Primary Examiner*—Bao Q Truong
(74) *Attorney, Agent, or Firm*—McKee, Voorhees & Sease, P.L.C.

(57) ABSTRACT

An apparatus and method for producing a light output pattern from a single LED source through a lens that diverges light at or around the center of the lens from a single source but converges light at concentric areas around the center area. The assembly can avoid a central hot spot of intensity in the light output pattern and create one or more concentric rings of higher apparent intensity.

54 Claims, 8 Drawing Sheets
(3 of 8 Drawing Sheet(s) Filed in Color)

| Data points for inner lens surface of 4" Round Lens ||||||||
|---|---|---|---|---|---|---|---|
| Point # | X | Y | Point # | X | Y | Point # | X | Y |
| 1 | 0.1159 | 0.8776 | 39 | 0.894 | 0.8928 | 77 | 1.5298 | 0.7297 |
| 2 | 0.1238 | 0.878 | 40 | 0.9148 | 0.8935 | 78 | 1.5511 | 0.756 |
| 3 | 0.1318 | 0.8785 | 41 | 0.9356 | 0.8931 | 79 | 1.5724 | 0.7827 |
| 4 | 0.1397 | 0.8791 | 42 | 0.9563 | 0.8917 | 80 | 1.5937 | 0.8102 |
| 5 | 0.1476 | 0.8797 | 43 | 0.9622 | 0.8074 | 81 | 1.615 | 0.838 |
| 6 | 0.1555 | 0.8805 | 44 | 0.9762 | 0.8257 | 82 | 1.6363 | 0.8663 |
| 7 | 0.1635 | 0.8812 | 45 | 1.0041 | 0.8628 | 83 | 1.648 | 0.6995 |
| 8 | 0.1714 | 0.882 | 46 | 1.032 | 0.9007 | 84 | 1.67 | 0.7258 |
| 9 | 0.2202 | 0.882 | 47 | 1.0392 | 0.7974 | 85 | 1.692 | 0.7528 |
| 10 | 0.2837 | 0.8999 | 48 | 1.0544 | 0.8155 | 86 | 1.714 | 0.7804 |
| 11 | 0.2861 | 0.8309 | 49 | 1.0667 | 0.8311 | 87 | 1.736 | 0.8088 |
| 12 | 0.3711 | 0.8594 | 50 | 1.0789 | 0.8483 | 88 | 1.758 | 0.8382 |
| 13 | 0.4439 | 0.8853 | 51 | 1.0881 | 0.8624 | 89 | 1.776 | 0.8329 |
| 14 | 0.5289 | 0.9161 | 52 | 1.1003 | 0.8843 | 90 | 1.7869 | 0.677 |
| 15 | 0.5333 | 0.8534 | 53 | 1.1086 | 0.7762 | 91 | 1.808 | 0.7015 |
| 16 | 0.5427 | 0.858 | 54 | 1.1279 | 0.7981 | 92 | 1.8291 | 0.7268 |
| 17 | 0.5522 | 0.8624 | 55 | 1.1472 | 0.8209 | 93 | 1.8503 | 0.7525 |
| 18 | 0.5616 | 0.8667 | 56 | 1.1665 | 0.8441 | 94 | 1.8714 | 0.779 |
| 19 | 0.5711 | 0.8711 | 57 | 1.1858 | 0.8679 | 95 | 1.9038 | 0.8205 |
| 20 | 0.5805 | 0.8754 | 58 | 1.1955 | 0.8802 | | | |
| 21 | 0.59 | 0.8797 | 59 | 1.2034 | 0.7666 | | | |
| 22 | 0.5994 | 0.884 | 60 | 1.2232 | 0.7885 | | | |
| 23 | 0.6088 | 0.8882 | 61 | 1.2429 | 0.8112 | | | |
| 24 | 0.6183 | 0.8925 | 62 | 1.2627 | 0.8345 | | | |
| 25 | 0.6277 | 0.8967 | 63 | 1.2825 | 0.8582 | | | |
| 26 | 0.6656 | 0.9022 | 64 | 1.2924 | 0.8705 | | | |
| 27 | 0.6817 | 0.902 | 65 | 1.2977 | 0.7656 | | | |
| 28 | 0.6977 | 0.9015 | 66 | 1.3244 | 0.7906 | | | |
| 29 | 0.7138 | 0.9009 | 67 | 1.349 | 0.8157 | | | |
| 30 | 0.7299 | 0.8992 | 68 | 1.3737 | 0.8411 | | | |
| 31 | 0.746 | 0.8936 | 69 | 1.3983 | 0.8669 | | | |
| 32 | 0.7485 | 0.8609 | 70 | 1.4107 | 0.8798 | | | |
| 33 | 0.7693 | 0.8686 | 71 | 1.4194 | 0.7547 | | | |
| 34 | 0.7901 | 0.8752 | 72 | 1.4416 | 0.7806 | | | |
| 35 | 0.8109 | 0.8807 | 73 | 1.4639 | 0.8071 | | | |
| 36 | 0.8316 | 0.8852 | 74 | 1.4861 | 0.8347 | | | |
| 37 | 0.8524 | 0.8887 | 75 | 1.5083 | 0.8633 | | | |
| 38 | 0.8732 | 0.8913 | 76 | 1.5195 | 0.8782 | | | |

[ X AND Y IN INCHES ]

SINGLE LED AND LENS ASSEMBLY

CROSS-REFERENCE TO RELATED APPLICATIONS

This application claims priority under 35 U.S.C. § 119 of Provisional Application Ser. No. 60/685,818 filed May 31, 2005, which application is hereby incorporated by reference in its entirety.

BACKGROUND OF THE INVENTION

1. Field of the Invention

The present invention relates to a lighting assembly utilizing a single LED as the light source and a lens for modification of the output of the single LED. In particular, the invention relates to a light assembly that attenuates the appearance of intensity along the optical axis of the light source and accentuates the appearance of intensity at one or more surrounding areas of the center axis.

2. Problems in the Art

Many lighting assemblies or fixtures with a single light source result in a central "hot spot"; the appearance of much higher intensity in alignment with the light source, with progressively diminishing apparent intensity moving radially away from the light source. This is true even with transparent or translucent covers or lenses over the light source. While many applications function adequately for the intended lighting or illumination purpose in that configuration, it can be distracting. In some cases it can even represent a safety concern. Furthermore, it is aesthetically and visually displeasing in certain applications or to certain people.

Additionally there are circumstances where an apparent "hot spot" at the lens of a light assembly performs adequately, but conventional light sources, like incandescent sources, leave room for improvement with respect to such things as durability, effective operating life, and electrical power consumption.

An example is a tail light for an over-the-road semi-trailer pulled by a semi-trailer truck, otherwise known as a tractor or semi. Many times such a tail light is multi-functional, in the sense it performs several functions, e.g., brake light function, turn signal function, and running light function. For simplicity and cost purposes, many conventional semi-trailer tail lights combine all three functions in a single light assembly. They commonly are four inch round diameter devices including a cup-shaped base holding a single incandescent lamp covered with a red transparent or translucent lens. The running light function involves illuminating the incandescent lamp at a first intensity. Well known circuitry increases the intensity to the incandescent lamp if the truck's brakes are operated. Intensity is varied if the turn signal is operated.

There are well known regulations (e.g. DOT/SAE) regarding the light output for such multi-function lights, including the light pattern and its intensity. The relatively low cost of incandescent sources has resulted in lights of this type essentially comprising a relatively high-powered incandescent lamp, an economical base, and a simple, minimal complexity cover or lens. DOT/SAE regulations generally specify just minimum intensity requirements at a certain distance away from the light. Therefore, the state-of-the-art generally takes the approach of generating well over the needed intensity with the relatively cheap incandescent source and directing it through minimal optics, all with the hope of flooding the target space of the regulations sufficiently to meet the minimums.

However, room for improvement with regard to this type of light has been identified. The above-described combination basically results in a "hot spot" of intensity right at the center of the tail light, with diminishing intensity as you move out from the lens center. If the brake or turn signal function is operated, it accentuates the hot spot. It can be distracting, and even dangerous, for someone following a large vehicle. It can create discomfort or even disability glare that could impair safety of the driver in the vehicle following.

There is a real need in the art, therefore, for a tail light light that meets minimum intensity requirements for such a light but without the "hot spot".

The mere fact the hot spot is visually distracting, and to some unappealing, is a problem in the art. There is therefore a real need in the art for a tail light of this type that does not have a central hot spot.

Incandescent light sources, although relatively cheap, have many weaknesses. They utilize glass envelopes and thin metal filaments. They are susceptible to vibration and shock. They also have inconsistent and relatively limited expected operating life relative to other light sources such as light emitting diodes (LEDs). They also tend to be relatively inefficient with respect to electrical power consumption.

It is well known that LEDs have substantial anticipated operating life (thousands of hours) and typically outlast incandescent sources by substantial amounts. They are also shock resistant and power efficient compared to incandescent lights. Attempts have been made to use LEDs in tail lights. However, they are significantly more expensive than incandescent sources, and conventional LEDs do not have as high of light output. Therefore typical LED attempts have used a plurality (four or more) LEDs. This multiplies the cost because the LEDs represent a significant amount of overall cost of such fixtures. Tail lights each having multiple LEDs have become increasingly accepted but are considered a premium or high cost product.

There is therefore a real need in the art for an improvement regarding this type of light.

Analogous issues exist for other lights. This includes other automotive-type lights or other light applications outside of automotive uses. Interior lighting is but one example.

BRIEF SUMMARY OF THE INVENTION

It is therefore the principle object, feature, advantage or aspect of the present invention to provide an apparatus and method which solves or overcomes problems and deficiencies in the art.

Other objects, features, advantages or aspects of the present invention include an apparatus and method as above described which:

a. utilizes a single LED source as the light source;
b. if applicable, meets government or other regulations for output pattern and intensity;
c. is long-lived;
d. is durable and robust;
e. is power efficient;
f. is relatively economical; and
g. is practical;
h. takes away a central perceived "hot spot" from the light.

According to one aspect of the present invention, a tail light apparatus includes a single LED light source and a lens. Specific regions of a lens are directed to pre-determined specific regions of an output pattern from the light. In one example, radially outward lens surfaces direct light to the center of the pattern. More central lens surfaces direct relatively less light to the center of the pattern. This results in brighter areas at the outward portions and lower apparent intensity at the central portion. This presents a distinctive appearance and reduces a single central "hot spot" that can cause glare.

In another aspect of the invention, a method of producing a light output pattern from a single LED source is provided. The output pattern has a center and a perimeter and is generated through a lens which is substantially larger than the single light source but avoids a high intensity appearance or "hot spot" at the center—i.e. along an axis between the source and the center of the output pattern. The method includes adapting a lens area to direct a relatively smaller amount of light from the source to and around the center of the output pattern; while at the same time adapting other areas of the lens to direct relatively larger amounts of light to the center of the output pattern. This attenuates perceived intensity at the traditional center "hot spot" of the light while maintaining light output requirements of the pattern. Manipulation of light from the single LED light source in this manner allows a unique appearance when operating, while meeting light output intensity requirements and diminishing or eliminating a single "hot spot".

According to another aspect of the present invention, an apparatus includes a base with an opening, a single LED source operatively mounted in the base, and a cover over the opening. The cover comprises a first lens portion directing a relatively small amount of light from the source to the center of an output pattern and a second lens portion directing a relatively large amount of light from the source to the center of the output pattern.

BRIEF DESCRIPTION OF THE DRAWINGS

The file of this patent contains at least one drawing executed in color. Copies of this patent with colored drawing(s) will be provided by the Patent and Trademark Office upon request and payment of the necessary fee.

FIG. 6 is a chart defining the inner surface of the lens of FIG. 5.

DETAILED DESCRIPTION OF EXEMPLARY EMBODIMENT

Overview

For better understanding of the invention, one example of a form the invention can take will now be described in detail. Frequent reference will be taken to the drawings, described above, and reference numbers and/or letters will be used to indicate certain parts or locations in the drawings. The same reference numbers and letters will be used to indicate the same parts and locations throughout the drawings unless otherwise indicated.

This exemplary embodiment will be described in the context of a red, four inch diameter round, stop-tail-turn light, according to DOT/SAE regulations, for vehicles including over-the-road semi-trailers. Specifically, the DOT/SAE regulation is SAE Surface Vehicle Standard J2040 (March 2000 Revision) for Tail Lamps (Rear Position Lamps) for Use on Vehicles 2032 mm or more in Overall Width. The standard is available from The Engineering Society For Advanced Mobility Land Sea Air and Space International, 200 Commonwealth Dr., Warrendale, Pa. 15096-0001, and is incorporated by reference herein in its entirety. The lighting assembly is a single cavity, single LED source fixture that is operable from a standard over-the-road truck electrical system. It is to be understood that this invention is not limited by this example and can take many forms and embodiments with variations from this exemplary embodiment.

Apparatus

Figure 1:
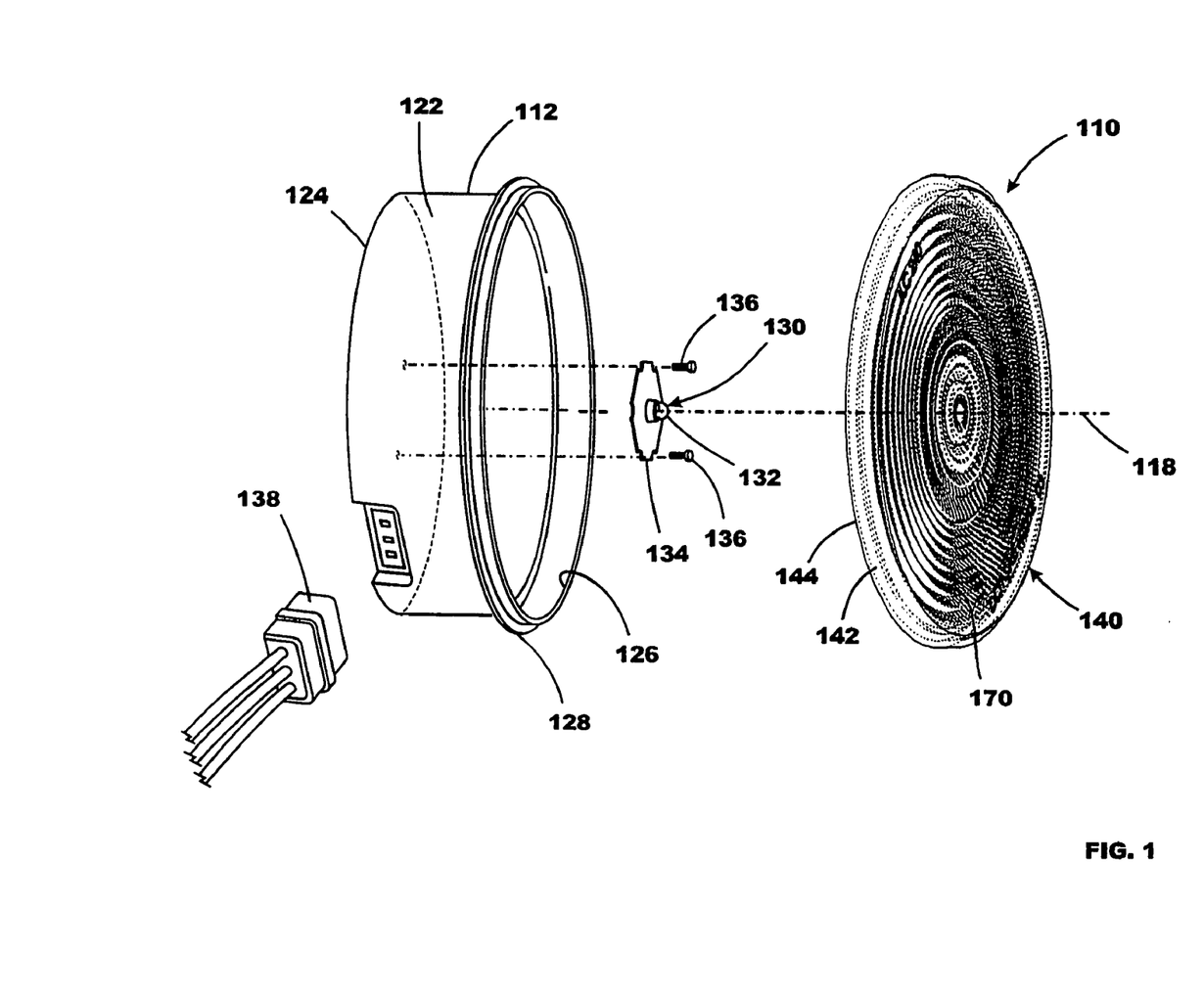
FIG. 1 is an exploded view of a multi-function semi-trailer tail light according to one exemplary embodiment of the present invention.

FIG. 1 illustrates the basic components of the tail light 110 according to the exemplary embodiment. A base 112 has a single cavity in which a single LED source 130 is operatively mounted according to means or methods within the skill of those skilled in the art. For purposes of discussion, an axis 118 will be referred to as the optical or center axis of tail light 110. LED 130 is mounted substantially in alignment with axis 118, which also is generally the central longitudinal axis of tail light 110 and passes through the center of a covering lens 140 that attaches over the opening to the cavity of base 112.

Figure 2:
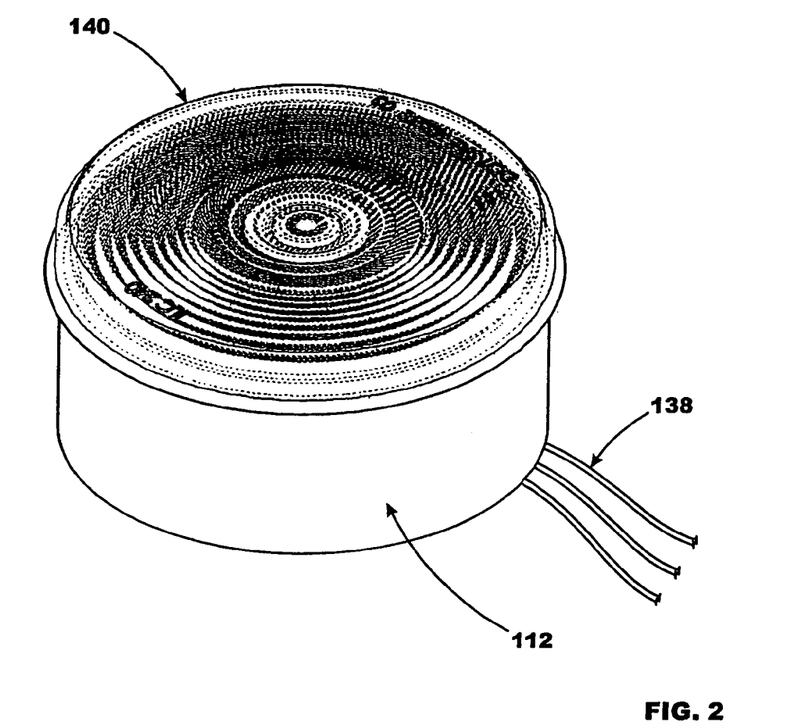
FIG. 2 is an assembled view of FIG. 1.

FIG. 2 shows tail light 110 in assembled form. As an assembly, it is configured to fit into industry standard openings and structure on the back of a conventional over-the-road semi-trailer 12 (see FIG. 3).

Figure 3:
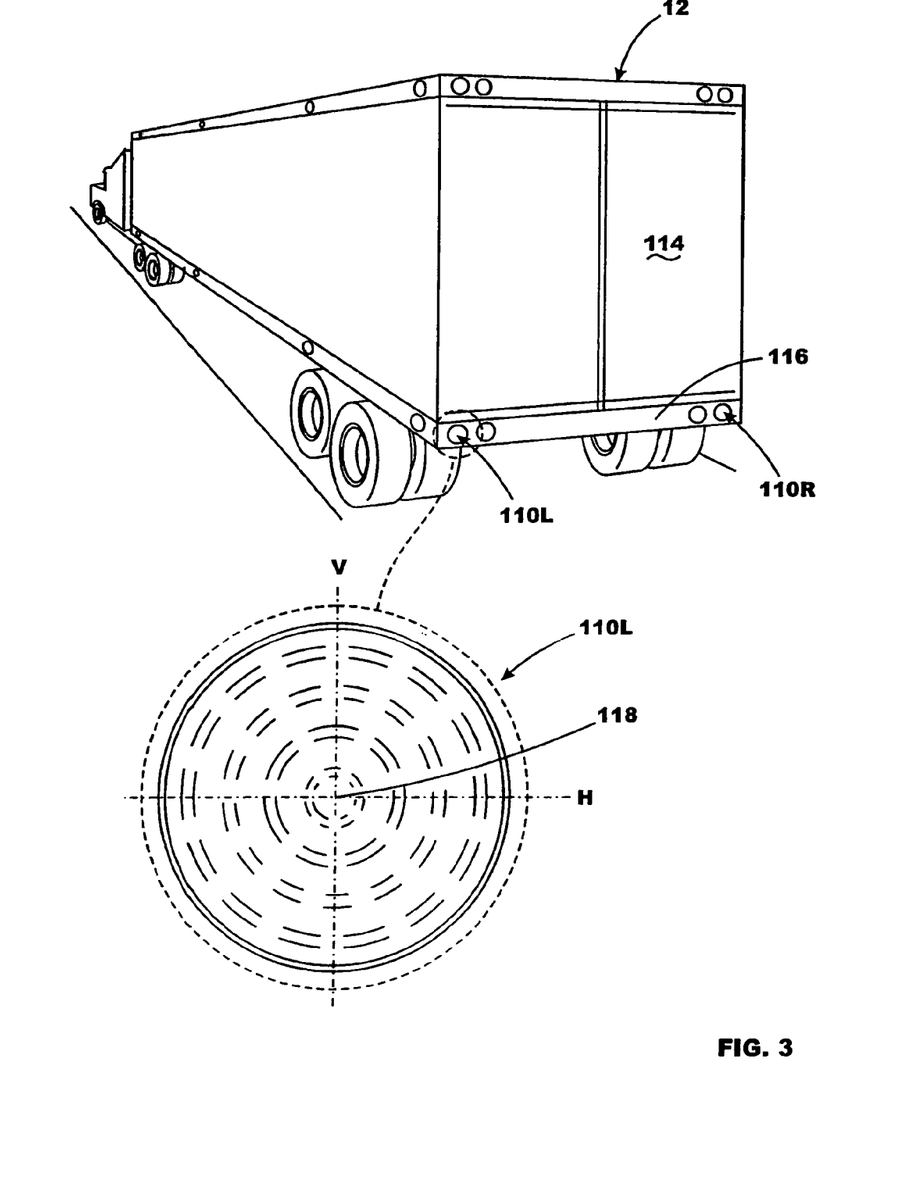
FIG. 3 is a diagrammatic view of a semi-trailer and its truck showing location of a pair of light assemblies of FIG. 1 installed on the semi-trailer.
Figure 4:
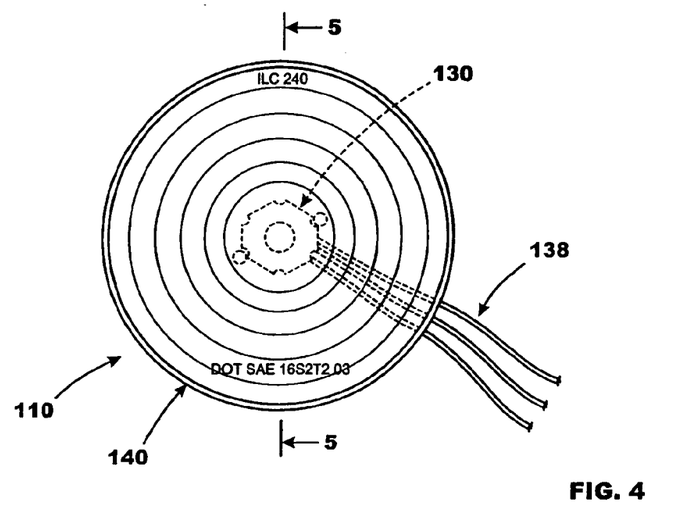
FIG. 4 is a front elevation of the assembly of FIG. 2.

FIG. 3 diagrammatically illustrates such a trailer 12. Two tail lights 110L and R are installed at opposite lateral sides of a cross member or bumper 116. Each is operatively connected to the wiring harness for a trailer 12 and will operate according to instructions based on turning the running lights on for the truck, operating the brakes, and/or operating the tail or turn light for either side.

Tail lights 110 are approximately four inch diameter red lens, grommet mount, lights. Therefore, when not on, they look similar to conventional four inch diameter red lens, grommet mount, state-of-the-art tail lights, whether those that utilize a single incandescent source or multiple LED sources.

With reference to FIGS. 1-5, base 112 of tail light 110 is basically a molded, plastic, cup-shaped member having a generally cylindrical side wall 122, a closed back 124, an open front 126, and a flange or lip 128 around the open front 126. It can be made economically through conventional manufacturing techniques and essentially defines an enclosure or cavity. A conventional mounting board and/or a heat sink (not shown) can mount within base 112. A relatively high-powered red LED 130 (e.g. Luxeon model # LXH-LMH1D (Lambertian beam pattern), 1 watt red single LED (from Lumileds Lighting U.S. L.L.C., San Jose, Calif., USA), preferably forward voltage S Bin rating or higher) has a light emitting portion 132 extending along axis 118 and is mounted to mounting member/circuit board 134 which is mounted to base 112 or to another board and/or heat sink in base 112 by screws 136. Circuit board 134 has electrical contacts (not shown). Wiring extends between the electrical contacts of LED mount/circuit board 134 and an internal plug (not shown). A grommeted wiring plug 138, with associated power wires, can releaseably plug into base 112. These features are conventional in the art.

Figure 5:
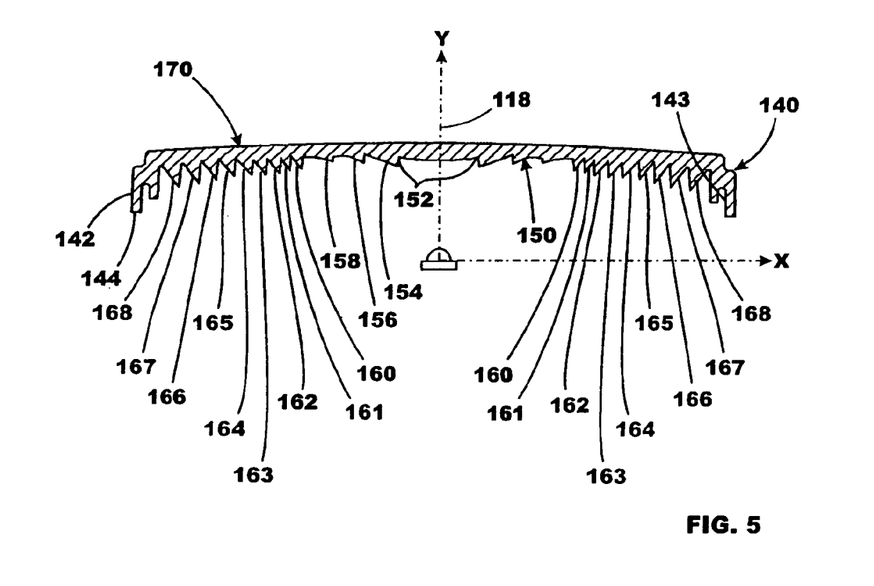
FIG. 5 is a sectional view substantially to scale of just the lens of the light assembly of FIG. 4 taken along line 5-5 of FIG. 4.

Lens 140 is generally circular with a generally cylindrical side wall 142. As can be seen in FIG. 5, side wall 142 has an outer annular edge 144. The combination allows lens 140 to be matingly fit over the front edge 126 of base 112 and sit on flange 128. Lens 140 can be secured in place by adhesives, snap fit, interference fit, threaded connection, or other methods. One example would be a sonic weld or seal as lens 140 is made of polycarbonate, as is housing or base 112.

As is illustrated in FIGS. 1 and 2, and shown in more detail in FIG. 5, lens 140 has a relatively smooth outer or exit surface 170, but a shaped inner surface 150 (see FIG. 5). Shaped inner surface 150 basically uses a combination of refraction and/or internal reflection to control not only the output pattern of tail light 110 when light source 130 is on, but also the intensity distribution of the light 110.

Around axis 118 at lens 140 is a central portion 152 (see FIG. 5). It is slightly convex on inside surface 150. A first raised facet 154 surrounds central portion 152, and is generally circular and centered on axis 118. Facet 154 has a sheer inward side and a long sloping outward side.

A second facet 156 surrounds first facet 154 and is smaller but of similar shape. This is followed by a still smaller third facet 158.

Thereafter there are nine concentric facets having sheer inward sides and relatively steep opposite or outward sides. Each facet is essentially as big or bigger than a preceding facet. Reference numbers 160-168 refer to those nine facets.

FIG. 5 shows, in isolation, a cross section of the specific profiles or topographies of the relatively smooth outer surface 170 of lens 140 and the multi-faceted inner surface 52 of lens 140. FIG. 5 also shows that profile relative to where LED 130 and its circuit board 134 would be positioned when assembled into base 112.

FIG. 6 illustrates data points that define surface 150 and its profile as follows. The X and Y values for each data point 1-95 refer to distances, in inches, relative the X and Y axes of shown in FIG. 5. The X axis is in the plane defined by the top of the circuit board 134 of LED 130 when that combination is assembled into tail light 10. The Y axis is orthogonal to the X axis and extends up through essentially the center of lens 40 (and thus, is essentially co-axial with optical axis 118). Thus, as illustrated in FIG. 5, data point 1 would define the bottom surface 150 of lens 140 at 0.1159 inch along and to the right of axis Y and 0.8776 inch up from and perpendicular to axis X. Data point 2 would define bottom surface 150 a slight distance more to the right along axis X, and so on until point 95, which is radially close to 2 inches away from central axis 118 (or the Y axis).

The data points of FIG. 6 would define the topography, so to speak, of the inner side 150 of lens 140 along a radius from the central axis 118 radially outward towards the perimeter edge of lens 140. This same topography would be revolved 360 degrees around central axis 118 to create the entire surface 150. For example, a tool can be made that is complementary to the topography defined by the data points of FIG. 6. A lens blank can then be turned, or the tool turned relative the lens blank, to revolve the lens blank relative the tool to create the 360 degree lens surface 150. Some straight line approximation may be used to make the tool, but the data points of FIG. 6 should be close enough together that they are sufficient to define, to within reasonable limits of optical accuracy for this application, the surface 150 of FIG. 5.

Operation

When light source 130 is on, it generates an output pattern basically conical or hemispherical in shape centered around axis 118. Light incident on center portion 152, and the areas comprising facets 154, 156, 158, is substantially refracted away from axis 118.

Conversely, light incident on facets 160-168 is substantially refracted, and internally reflected and refracted, towards axis 118.

As a result, lens 140 functions to essentially direct a relatively small amount of light from single source 130 towards the center of the output pattern from fixture 110, whereas it directs a relatively large amount of light from source 130 towards the center of output pattern of fixture 110. Essentially, central portion 152 of surface 150, and to so extent facets 154, 156, and 158 tend to prevent light from LED 130 from creating a relatively high intensity "hot spot" at the center of lens 140 by directing some light away from the central axis 118, and thus away from the center of the output pattern of lens 140. On the other hand, facets 161-168 tend to direct light back towards central axis 118, or towards the center of the output pattern. However, since they are radially lateral of axis 118, they tend to create an output that appears like concentric rings of higher intensity than the intensity at the center portion of lens 140. There is still intensity across lens 140, but a viewer's eyes perceive higher apparent intensity concentric rings and a lower apparent intensity central portion. This creates a distinctive pattern while removing the apparent central and glare-producing "hot spot" of many conventional tail lights.

Not only is tail light 10 designed to produce the output pattern characteristics described above, but also to meet or exceed DOT/SAE intensity minimums for such a tail light for all test points in regulatory pattern SAE J2040 (March 2000 Revision) for such lights. However, it tends to attenuate the perceived intensity at and around the middle of lens 140 to an observer, and accentuates the perceived intensity at outer portions of lens 140. Even when light source 130 is operated to increase intensity for braking or turn signal functions, lens 140 eliminates the "hot spot" of conventional single light source tail lights but accentuates the intensity around and towards the perimeter of tail light 110.

More specifically, the embodiment of tail light 110 creates an intensity distribution at lens 140 wherein an observer would observe bright concentric rings towards the outside of lens 140 and would not see a "hot spot" in the middle of lens 140. This presents not only an improvement regarding the distraction potential or glare of a hot spot in the middle, but also provides a unique and aesthetically pleasing visual effects for tail light 110. The enlarged depiction of light 110 in FIG. 3 is intended to diagrammatically illustrate the higher apparent intensity more peripheral concentric rings for lens 140 with the three outermost pairs of concentric broken lines. There is still some intensity at the middle (see innermost pair of concentric broken lines, but not a "hot spot".

It is to be understood that each facet 161-168 could produce its own apparent "ring" of light. However, lens 140 tends to produce a brightest apparent ring near the outside of lens 140, and then several smaller rings inside that.

Figure 7:
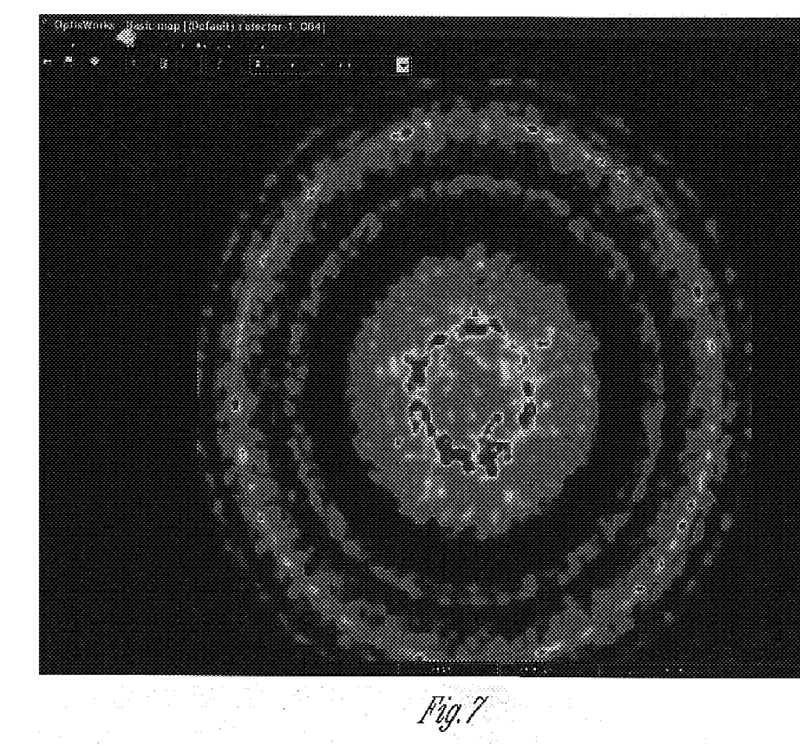
FIG. 7 is a candela optical pattern for the embodiment of FIG. 1.
Figure 8A:
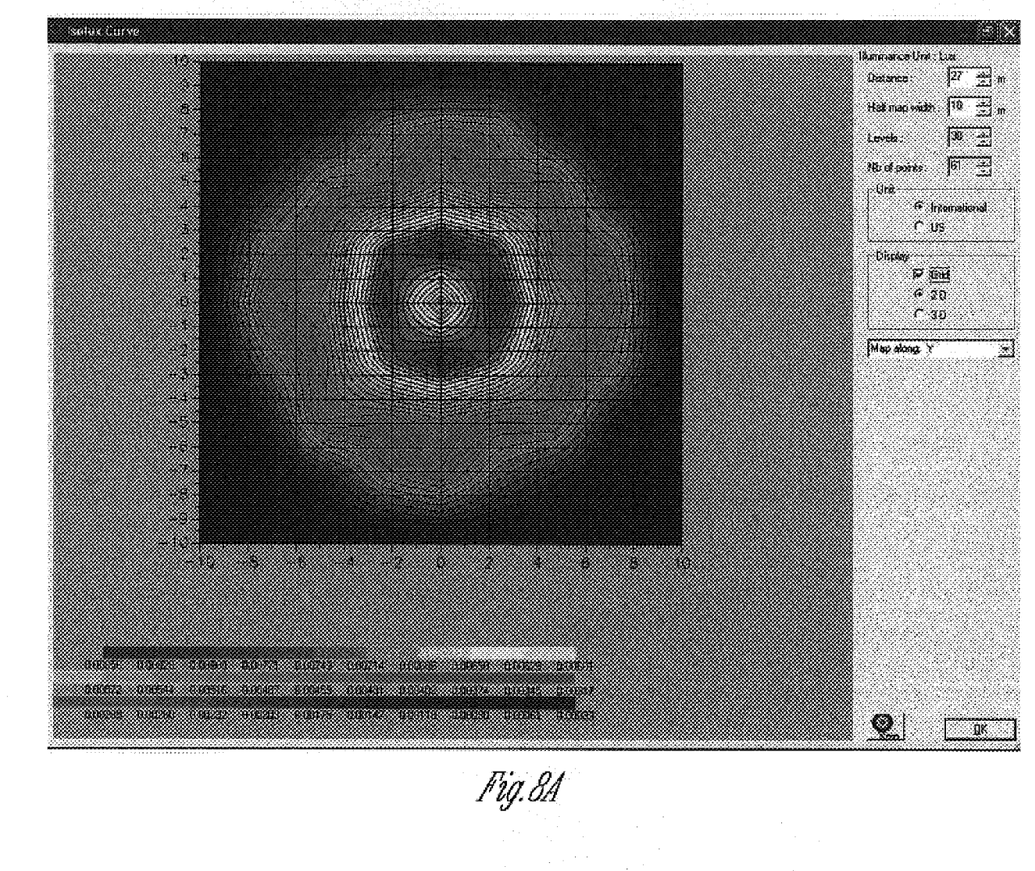
FIGS. 8A and B are Isolux curve plots of the output pattern of the embodiment of FIG. 1.
Figure 8B:
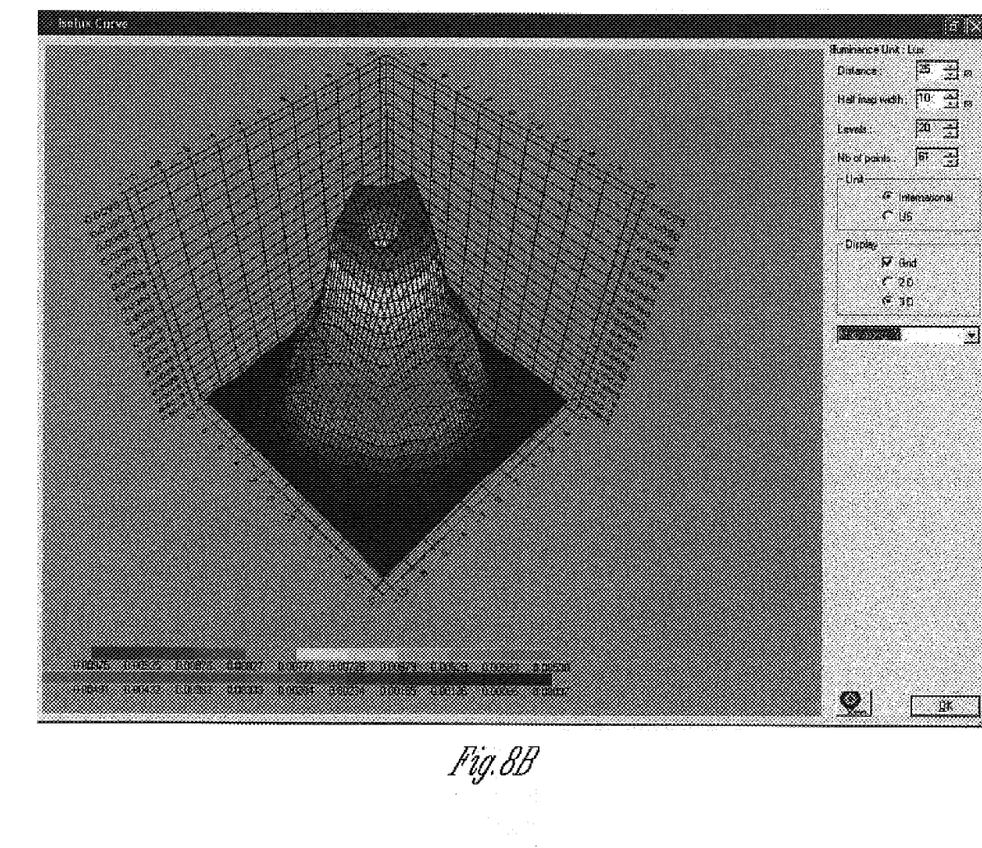

FIGS. 7 and 8A and B provide more information about the specific output pattern of tail light 110. Note the specific concentric ring patterns in the candela plot of FIG. 7. Candela values are shown by the following colors, with white being highest and black being lowest: red, orange, yellow, light green, green, light blue, dark blue. As can be seen in FIG. 7, the concentric ring around the center of the pattern is brightest; not the center. Thus, the center "hot spot" of state of the art lights is eliminated. There are alternating rings of higher and lower brightness to produce the specific pattern. Note that the brighter rings are not necessarily the same width or equally spaced from each other. In FIG. 7 they have varying widths and spacing.

FIGS. 8A and B are Isolux plots of the output pattern, such as are well-known in the art. Note how FIG. 8B shows the intensity fall off of the output pattern.

Light source 130 operates off of 16 volt DC with an energy draw of 350 milliamps. It is rated for 100,000 hours service life. Plug 138 and its wiring, as well as other circuitry to supply electrical power to LED 130, can be industry standard. The entire tail light 110 can be impact resistant and meet DOT/SAE standards.

Light 110 accomplishes this operation and functionality in a physical assembly that looks almost identical to a conventional, single source, incandescent, four inch diameter, round, red tail light for such vehicles.

Options and Alternatives

It will be appreciated that the present invention can take many forms and embodiments. The above-described exemplary embodiment is only one example. Variations obvious to those skilled in the art are included within the invention, which is described solely by the claims appended herein.

For example, variations in specific forms, materials, and dimensions, functions, and applications are possible while staying within the scope of the invention. It could be utilized for other automotive light applications, or it could be utilized for other lighting applications. One example would be an interior, non-regulated lighted. It could retain an illumination level that is functional but without a hot spot and the unique perimeter, apparent higher intensity rings.

Additionally the specific profile of surface 150 of lens 140 could be varied to alter the areas of higher apparent intensity. They do not necessarily need to be concentric rings.

What is claimed is:

1. A method of producing a light output pattern from a single light-emitting diode source through a substantially larger lens which avoids a high intensity appearance along an axis between the single light-emitting diode source and the lens, comprising:
   a. adapting an area of the lens at its intersection with the axis to direct a relatively smaller amount of light from the source to and around the axis;
   b. adapting other areas of the lens away from area to direct a relatively larger amount of light from the source to the axis;
   c. so that specific areas of the lens provide varying intensity to different regions of the output pattern wherein the apparent intensity at the center of the lens is substantially less than the apparent intensity of the other portions of the lens.

2. The method of claim 1 wherein the lens is a four inch round red tail light lens for semi-tractor trailers and the axis is a central axis.

3. The method of claim 2 wherein the said area of the lens directs some light from the single light-emitting diode source away from the central axis and directs some light from said other areas of the lens towards the central axis to create higher intensity concentric rings around lower intensity central portion of the output pattern.

4. The method of claim 1 wherein a cross-sectional profile of the lens at substantially any diameter of the lens is as shown in FIG. 5.

5. The method of claim 1 wherein the lens has an inner side proximal to the light-emitting diode source and an outer side distal from the light-emitting diode source, and wherein the light-emitting diode source is mounted on a circuit board defining a plane generally spaced from and parallel the inner side of the lens, and the inner side of the lens is a revolution of a radius from the central axis of the inner side of the lens defined by the data points in FIG. 6, where X is a distance from the central axis radially in inches and Y is a distance from the plane of the circuit board to the inner side of the lens in inches.

6. The method of claim 5 wherein the inner side of the lens comprises a plurality of facets.

7. The method of claim 6 wherein the plurality of facets are adapted to converge light by refraction and/or total internal reflection.

8. The method of claim 1 wherein the perimeter of the output pattern is somewhat divergently circular in angle space and generally concentric to a center.

9. The method of claim 1 wherein the single light-emitting diode source is generally along the axis.

10. The method of claim 9 wherein the output of the light-emitting diode is generally diverging in angle space.

11. The method of claim 10 wherein the generally diverging in angle space comprises a substantially conical spread.

12. The method of claim 9 wherein the light-emitting diode is a watt light-emitting diode.

13. The method of claim 12 wherein the light-emitting diode has a red color output.

14. The method of claim 2 wherein the tail light performs tail, turn, and brake light functions.

15. The method of claim 2 wherein the light output pattern is adapted to meet Department of Transportation/Society of Automotive Engineers intensity test point minimums for a red four inch round semi-trailer tail light.

16. The method of claim 6 wherein the facets are concentric around the axis.

17. The method of claim 16 wherein the facets distribute intensity in concentric rings.

18. The method of claim 17 wherein there are nine concentric rings.

19. The method of claim 17 wherein the concentric rings are higher in intensity than the apparent intensity of the center of the lens.

20. The method of claim 1 wherein the light output pattern is for an automotive function.

21. The method of claim 20 wherein the automotive function is a stop/turn/tail light.

22. The method of claim 1 wherein the lens has a cross sectional profile at substantially any diameter of the lens as defined in FIG. 5.

23. The method of claim 22 wherein the lens has an inner side and an outer side, and the cross-sectional profile of a radius of the inner side of the lens is defined by the data points of FIG. 6, where the X value is measured in inches radially from the axis and the Y value is measured in inches from a plane defined by the top of a circuit board upon which the light-emitting diode is mounted.

24. The method of claim 1 wherein the light output pattern is adapted for interior lighting.

25. A lighting apparatus comprising:
   a. a base with an opening;
   b. a single light-emitting diode source adapted to mount in the base;
   c. a lens adapted to cover the opening;
   d. the lens having a first portion directing a relatively small amount of light from the light-emitting diode source to the center of an output pattern defined by the light-emitting diode source and the lens;

e. a second portion directing a relatively large amount of light from the light-emitting diode source to the center of the output pattern defined by the light-emitting diode source and the lens;

f. so that when operated, a viewer perceives a brighter area relative to the second portion of the lens and a less brighter area relative to the first portion of the lens.

26. The apparatus of claim 25 wherein the apparatus is an automobile light.

27. The apparatus of claim 26 wherein the automobile light is a stop/turn/tail light.

28. The apparatus of claim 27 wherein the stop/turn/tail light is for a semi-trailer.

29. The apparatus of claim 28 wherein the light meets Department of Transportation and/or Society of Automotive Engineers output and intensity requirements.

30. The apparatus of claim 29 wherein the light is a four inch diameter lens.

31. The apparatus of claim 30 wherein the lens is red.

32. The apparatus of claim 31 wherein the lens has a cross section profile as shown in FIG. 5.

33. The apparatus of claim 31 wherein the lens has an inner side and an outer side, and the cross-sectional profile of a radius of the inner side of the lens is defined by the data points of FIG. 6, where the X value is measured in inches radially from the axis and the Y value is measured in inches from a plane defined by the top of a circuit board upon which the light-emitting diode is mounted.

34. The apparatus of claim 25 wherein the apparatus is adapted for use as an interior light.

35. The apparatus of claim 25 wherein the lens of molded plastic.

36. The apparatus of claim 35 wherein the molded plastic is polycarbonate.

37. The apparatus of claim 25 wherein the base is made of plastic.

38. The apparatus of claim 37 wherein the base includes a mount for a single light-emitting diode source.

39. The apparatus of claim 38 further comprising a plug adapted for operative connection to an electric power source.

40. The apparatus of claim 25 further comprising a circuit in the base.

41. The apparatus of claim 25 further comprising a heat sink in the base.

42. The apparatus of claim 25 wherein the light-emitting diode has a generally conical output.

43. The apparatus of claim 42 wherein the light-emitting diode is a Luxeon 1 watt light-emitting diode.

44. The apparatus of claim 43 wherein the light-emitting diode has a red color output.

45. The apparatus of claim 25 wherein the first portion of the lens diverges light.

46. The apparatus of claim 45 wherein the other portion converges light.

47. The apparatus of claim 46 wherein the other portion comprises facets that utilize refraction and/or total internal reflection.

48. The apparatus of claim 47 wherein the facets are concentric rings around the center of the lens.

49. The apparatus of claim 25 wherein the first and second portions are on the inner side of the lens.

50. A semi-trailer four inch round red tail light having a light output pattern and comprising:

a. a base;

b. a single light-emitting diode having a central optical axis and mounted on a circuit board defining a plane generally orthogonal to the central optical axis;

c. a round, red, at least partially light transmissive lens mountable to the base over the light-emitting diode;

d. the lens having a center area along the axis which substantially diverges light away from the axis and an outer concentric area that generally converges light towards the axis;

e. so that the center area reduces intensity in the center of the light output pattern along the axis and produces increased intensity in specific concentric parts of the light output pattern.

51. The light of claim 50 wherein the lens is four inch round and the light is adapted for operation as a turn/brake/tail light for an over-the-road semi-trailer.

52. The apparatus of claim 51 wherein the light output meets Department of Transportation and/or Society of Automotive Engineers requirements for over-the-road semi-trailer turn/brake/tail light.

53. The apparatus of claim 50 wherein the lens has a cross sectional profile at substantially any diameter of the lens as defined in FIG. 5.

54. The apparatus of claim 53 wherein the lens has an inner side and an outer side, and the cross-sectional profile of a radius of the inner side of the lens is defined by the data points of FIG. 6, where the X value is measured in inches radially from the axis and the Y value is measured in inches from a plane defined by the top of a circuit board upon which the light-emitting diode is mounted.

* * * * *